United States Patent [19]
Mizutani et al.

[11] Patent Number: 6,034,162
[45] Date of Patent: Mar. 7, 2000

[54] WEAR-RESISTANT AND FLAME-RETARDANT RESIN COMPOSITION, METHOD OF MANUFACTURING RESIN COMPOSITION, AND INSULATED ELECTRIC WIRE

[75] Inventors: Yukako Mizutani; Yasunori Sakai; Hiroshi Fujimoto, all of Yokkaichi, Japan

[73] Assignee: Sumitomo Wiring Systems, Ltd., Mie, Japan

[21] Appl. No.: 09/038,706

[22] Filed: Mar. 9, 1998

[30] Foreign Application Priority Data

Mar. 31, 1997 [JP] Japan ................................. 9-081214
Nov. 11, 1997 [JP] Japan ................................. 9-308557

[51] Int. Cl.⁷ .............................. C08K 3/10; B27N 9/00
[52] U.S. Cl. .......................... 524/437; 524/436; 428/921
[58] Field of Search .................... 524/436, 437; 428/921

[56] References Cited

U.S. PATENT DOCUMENTS 5,358,786  10/1994  Ishikawa et al. ...................... 428/380
5,378,856   1/1995  Allen .................................. 174/120 R

FOREIGN PATENT DOCUMENTS 0 370 517   5/1990   European Pat. Off. .
5-301996   11/1993   Japan .
6-76645     3/1994   Japan .
7-53787     2/1995   Japan .

*Primary Examiner*—Kriellion Sanders
*Attorney, Agent, or Firm*—Oliff & Berridge, PLC

[57] ABSTRACT

A wear-resistant and flame-retardant resin composition formed by kneading components (a) through (e) at a proportion in a specific range, wherein:

the component (a) is a copolymer of ethylene and $\alpha$-olefin having a melt index in a range of 0.1–5 g/10 min., containing comonomers in a range of 10–30 wt %, and containing one or more oxygen atoms in the molecule, the component (b) is linear chain polyethylene of low density having a melt index in a range of 0.1–5 g/10 min., a density in a range of 0.920–0.945, and a durometer hardness of 50–65, the component (c) is polyolefin having a durometer hardness of not less than 60, the component (d) is unsaturated carboxylic acid or polyolefin modified by a derivative thereof, and the component (e) is a metal hydroxide.

21 Claims, 1 Drawing Sheet

WEAR-RESISTANT AND FLAME-RETARDANT RESIN COMPOSITION, METHOD OF MANUFACTURING RESIN COMPOSITION, AND INSULATED ELECTRIC WIRE

BACKGROUND OF THE INVENTION

1. Field of the Invention

The present invention relates to a wear-resistant and flame-retardant resin composition containing a polyolefin resin as a main component thereof, a method of manufacturing the wear-resistant and flame-retardant resin composition and an insulated electric wire comprising the wear-resistant and flame-retardant resin composition as an insulating coating.

2. Description of Related Art

As the main insulating coating material for use in insulated electric wires of a vehicle, polyvinyl chloride resin has been hitherto adopted in view of its appropriate flexibility and flame retardancy.

However, the electric wire has a problem that when it is burned to discard the vehicle, hydrogen chloride gas is generated because the insulating coating material is burned in a stove, thus damaging the stove and being exhausted to the atmosphere and polluting the environment.

In order to solve the problem, in recent years research has been conducted for a flame-retardant resin composition not containing halogen components such as chloride as the insulating coating material of the electric wire. As disclosed in Laid-Open Japanese Patent Publication No. 5-301996, a resin composition consisting mainly of a mixture of polyolefin and a metal hydroxide has been proposed.

However, this kind of conventional flame-retardant resin composition has a problem in that it is less flexible or less bendable than polyvinyl chloride. In addition, the degree of its mechanical strength such as wear resistance and tensile strength is low because a large quantity of the metal hydroxide is mixed with the polyolefin to allow the resulting resin composition to be flame-retardant.

SUMMARY OF THE INVENTION

Therefore, it is an object of the present invention to provide a wear-resistant and flame-retardant resin composition which does not generate harmful gas when it is burned and which has a high degree of flexibility, flame retardancy, and wear resistance, although the wear-resistant and flame-retardant resin composition contains a smaller amount of metal hydroxide than a conventional composition. It is a further object of the invention to provide a method of manufacturing the wear-resistant and flame-retardant resin composition. It is a still further object of the invention to provide an insulated electric wire comprising the wear-resistant and flame-retardant resin composition.

In order to achieve these and other objects of the present invention, in an aspect of the present invention, there is provided a wear-resistant and flame-retardant resin composition containing the following components (a)–(e), such that the parts by weight of each of the components (a), (b), (c), and (d) is not less than five; the parts by weight of component (c) is less than or equal to the parts by weight of component (d), and the parts by weight of component (a) is less than or equal to the parts by weight of component (b); the total of the components (a), (b), (c), and (d) is 100 parts by weight; and the parts by weight of the component (e) is 40–150. The component (a) is a copolymer of ethylene and α-olefin having a melt index in a range of 0.1–5 g/10 min. containing the α-olefin comonomer in a range of 10–30 wt %, and containing one or more oxygen atoms in the molecule. The component (b) is a linear chain polyethylene of low density having a melt index in a range of 0.1–5 g/10 min., a density in a range of 0.920–0.945, and a durometer hardness (shore D) of 50–65. The component (c) is polyolefin having a durometer hardness (shore D) of not less than 60. The component (d) is unsaturated carboxylic acid or polyolefin modified by a derivative thereof. The component (e) is a metal hydroxide.

In another aspect of the present invention, there is provided a method of manufacturing the wear-resistant and flame-retardant resin composition, comprising the steps of kneading the material components (a), (b), (d), and (e), adding the material component (c) to the kneaded mixture, and kneading the material component (c) with the mixture.

In still another aspect of the present invention, there is provided an insulated electric wire comprising the wear-resistant and flame-retardant resin composition as an insulating coating on a periphery of a conductive core of the wire.

DETAILED DESCRIPTION OF PREFERRED EMBODIMENTS

Figure 1:
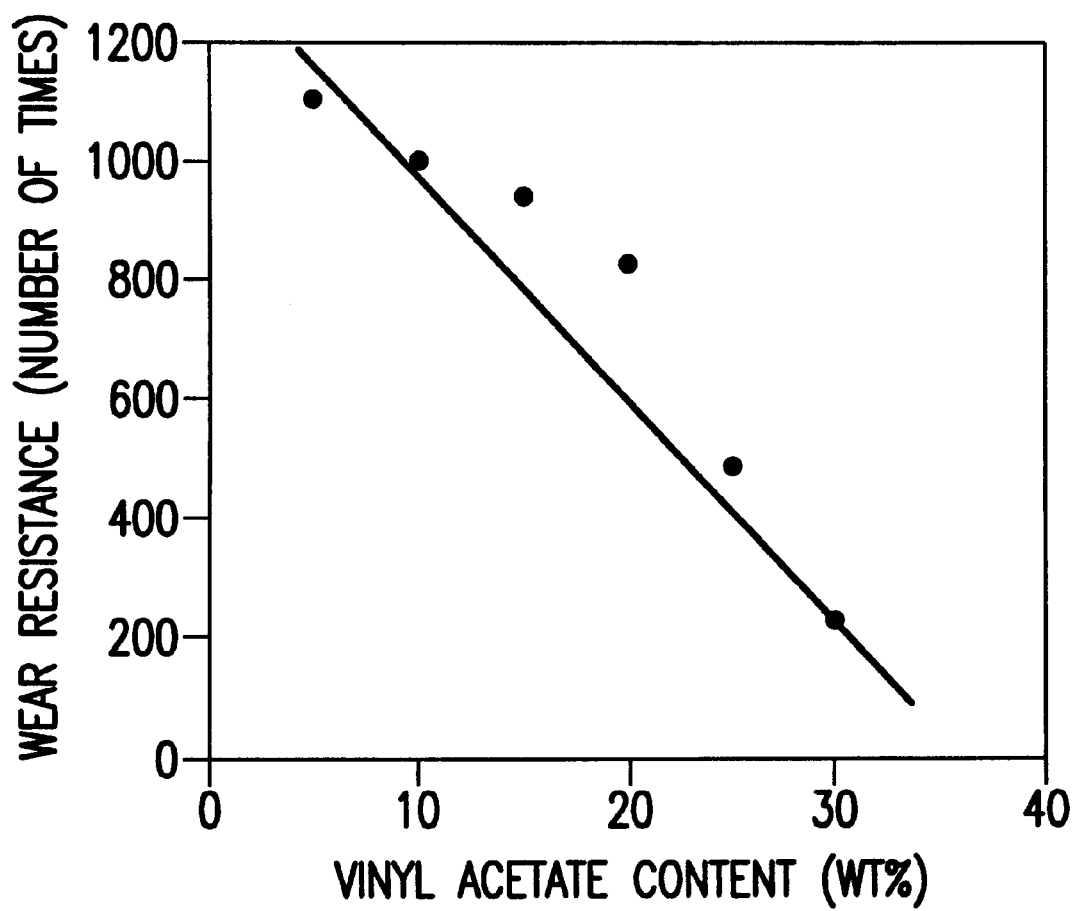
FIG. 1 is a graph showing the relationship between the content of comonomer and wear resistance of the composition of the invention.

The material component (a) which is used in the present invention may include, for example, a copolymer of ethylene and vinyl acetate, a copolymer of ethylene and ethyl acrylate, and a copolymer of ethylene and methyl methacrylate. Because the copolymer of ethylene and α-olefin containing one or more oxygen atoms in the molecule thereof is essentially more flame-retardant than ordinary olefin resins, it contributes to the reduction in the addition amount of the metal hydroxide.

The melt index of the material component (a) is in a range of 0.1–5 g/10 min. If the melt index is less than 0.1 g/10 min., extrusion processability of the resin composition may deteriorate, whereas if the melt index is more than 5 g/10 min., the degree of the mechanical strength of the wear-resistant and flame-retardant resin composition, such as the tensile strength and wear resistance, may become low.

The content of the α-olefin comonomers of the copolymer is 10–30 wt %. A method of evaluating the characteristic of each wear-resistant and flame-retardant resin composition, which will be described later, indicates that if the content of the comonomer is less than 10 wt %, the degree of the flame retardancy, chalking resistance and flexibility of the wear-resistant and flame-retardant resin composition may be low, whereas if the content of the comonomers is more than 30 wt %, the mechanical strength of the wear-resistant and flame-retardant resin composition, such as the tensile strength and wear resistance, is low. For example, the wear resistance of the copolymer of ethylene and vinyl acetate is less than 200 times, which is a target value when the comonomer content thereof exceeds 30 wt %, as shown in FIG. 1. When the content of the comonomer of the copolymer is in the range of 10–30 wt %, all the required characteristics are preferably balanced with one another.

If the copolymer of ethylene and α-olefin is contained in the composition in an amount less than five parts by weight, the wear-resistant and flame-retardant resin composition may lack flexibility, and thus may lack cold resistance and chalking resistance. If the parts by weight of the copolymer of ethylene and α-olefin is more than that of the material component (b) in parts by weight, the wear-resistant and flame-retardant resin composition may have an excessive degree of flexibility. Consequently, the wear-resistant and flame-retardant resin composition may lack the wear resistance and tensile strength required to be used as the coating resin of an electric wire.

It is to be noted that the copolymer of the ethylene and α-olefin used in the present invention has a block structure or a random structure. The characteristics of a copolymer of the ethylene and α-olefin having the block structure is similar to that of a copolymer of the ethylene and α-olefin having the random structure.

As the material component (c), polyethylene having a high density and polypropylene may be utilized, for example. The resin composition should contain not less than five parts by weight of the polyolefin having a durometer hardness not less than 60 to impart a sufficient degree of strength to the wear-resistant and flame-retardant resin composition.

Because the linear chain polyethylene of low density of the material component (b) has a property intermediate between the material components (a) and (c), it displays the function of acting as an intermediary between the two kinds of polymers, thus allowing the strength of the wear-resistant and flame-retardant resin composition to be higher than a resin composition not containing the material component (b).

The linear chain polyethylene of low density has a melt index of 0.1–5 g/10 min. If the melt index is less than 0.1 g/10 min., the extrusion processability of the resin composition is likely inferior, whereas if the melt index is more than 5 g/10 min., the mechanical strength, such as the tensile strength and wear resistance, may deteriorate. The density of the material component (b) is 0.920–0.945. If the density is not in the range, the mechanical strength of the wear-resistant and flame-retardant resin composition, such as the tensile strength and wear resistance, may not be balanced with the flexibility and the extrusion processability thereof. The durometer hardness of the material component (b) is in a range of 50–65. If the durometer hardness is less than 50, the wear-resistant and flame-retardant resin composition may lack mechanical strength such as tensile strength and wear resistance, whereas if the durometer hardness is more than 65, an appropriate flexibility of the resin composition may not be obtained.

The material component (d) increases the adhesiveness at the interface between the polymer component consisting of the resin composition and the metal hydroxide serving as a filler, thus having an action of increasing the mechanical strength of the wear-resistant and flame-retardant resin composition such as the wear resistance and tensile strength thereof and chalking resistance thereof. The wear-resistant and flame-retardant resin composition should contain not less than five parts by weight of the material component (d). If the addition amount of the material component (d) is less than five parts by weight or less than that of the material component (c), the improvement of the strength of the wear-resistant and flame-retardant resin composition may not be accomplished sufficiently because the function of component (d) of improving the adhesiveness at the interface between the polymer component and the filler may not be displayed sufficiently and further, the improvement of the chalking resistance of the resin composition may be insufficient. Further, the modified polymer accelerates the generation of a cinder, thus contributing to the improvement in the flame retardancy of the wear-resistant and flame-retardant resin composition and reducing the addition amount of the metal hydroxide.

Also, in some embodiments, the material component (d) may be present in an amount, for example, more than the polyolefin of the material component (c).

As the unsaturated carboxylic acid, maleic anhydride is most favorable. As the polyolefin, crystalline polyolefins such as polypropylene, polyethylene of a high density, linear chain polyethylene of a low density, and polyethylene of a low density are most preferred.

As this kind of adhesive polymer, in addition to the modified crystalline polyolefins, substances formed by modifying an amorphous polymer such as an ethylene-α-olefin copolymer or the like by means of unsaturated carboxylic acid is available. But according to experiments made by the present inventors, it is confirmed that these substances have little effect in improving the wear resistance and tensile strength of the wear-resistant and flame-retardant resin composition.

As the material component (e), magnesium hydroxide, aluminum hydroxide, and calcium hydroxide are preferable. Preferably, the average diameter of particles of these metal hydroxides is 0.1–5 μm in view of the dispersibility thereof into the polymer, the workability, and the characteristic of electric wires. Even if the average diameter of particles of these metal hydroxides exceeds this range, the object of the present invention may still be achieved. Further, preferably, in order to prevent the agglomeration of the metal hydroxides, improve the degree of the dispersibility thereof into the polymer, and improve the degree of the adhesiveness thereof to the polymer, it is preferable to use as the material component (e) a material in which the surface is treated by using silane coupling agent, titanate coupling agent, aliphatic acid, metallic salt of aliphatic acid, or the like.

Further, to enhance the degree of the flame retardancy of the wear-resistant and flame-retardant resin composition, a flame-retardant assistant such as hydrotalcite, silica, carbon black, zinc borate or a compound of phosphorous may be added. Further, anti-oxidant, lubricant, dispersant, copper inhibitor, crosslinking agent, crosslinking assistant or colorant may be added to the mixture of components which form the wear-resistant and flame-retardant resin composition. Further, one or more of the polymers may be crosslinked by various crosslinking methods.

In kneading the above-described respective material components, preferably after the polymer of the above-described material component (a), that of the material component (b) the material component (d) and the metal hydroxide are kneaded, the polyolefin of the material component (c) is added to the mixture of the material components (a), (b), (d) and (e). Then, the mixture of the material components (a), (b), (d) and (e) and the polyolefin of the material component (c) are kneaded.

The reason that this method is particularly effective is believed to be because, essentially, the polyolefin of the material component (c) and the metal hydroxide adhere to each other at a very low degree. Thus, when the addition amount of the polyolefin of the material component (c) is so large as to provide the resin composition with a sufficient degree of flame retardancy, the strength of the entire resin composition deteriorates greatly, which is the main cause of the deterioration in the wear resistance and tensile strength thereof and the occurrence of the chalking phenomenon. The polymer of each of the above-described material components (a), (b) and (d) has a higher degree of adhesiveness to the metal hydroxide than the polyolefin of material component (c). Thus, when these material components are kneaded all together, the polymers surround the entire periphery of the particles of the metal hydroxide. Then, when the polyolefin and the mixture are kneaded, particles of the metal hydroxide surrounded with the polymers are dispersed in the polyolefin. The degree of the adhesiveness of the polyolefin to the other polymers is much higher than that of the affinity of the polyolefin for the metal hydroxide. Thus, the particles of the metal hydroxide are surrounded with the polymer of each of the material components (a), (b), and (d) which have a comparatively higher degree of adhesiveness thereto, and the polymers are surrounded with the polyolefin.

Thus, the manufacturing method of the present invention allows the three components to adhere to each other at a much higher degree than the conventional method in which the polyolefin contacts particles of the metal hydroxide. Therefore, the entire resin composition is allowed to have a sufficient degree of flame retardancy owing to the addition of the metal hydroxide at the same proportion as the conventional compositions, to have an enhanced mechanical strength such as wear resistance and tensile strength, and to have an improved degree of flexibility and chalking resistance.

As described above, according to the wear-resistant and flame-retardant resin composition of the invention, the ethylene-α-olefin copolymer containing one or more oxygen atoms in its molecule has a higher degree of flame retardancy than ordinary olefin resins. Further, the generation of a cinder can be accelerated at the time of burning by the unsaturated carboxylic acid or the polyolefin modified by a derivative thereof. Thus, the entire polymer is allowed to have an improved degree of flame retardancy. Therefore, the addition proportion of the metal hydroxide serving as the flame-retardant agent is reduced by that much, and yet the wear-resistant and flame-retardant resin composition has an effect that it is allowed to secure a high degree of flame retardancy and maintain a high degree of mechanical strength such as wear resistance and tensile strength.

According to the manufacturing method of the invention, excluding the polymer of the material component (c) lacking the adhesiveness to the metal hydroxide, the other polymers and the metal hydroxide are kneaded. Then, the polymer of the material component (c) is added and the mixture is kneaded. Thus, the polymers adhere to the metal hydroxide at a high degree. Thus, the wear-resistant and flame-retardant resin composition has an excellent effect that the flame retardancy, tensile strength, flexibility, and chalking resistance can be enhanced.

According to the invention, because the resin composition according to the invention is used as the insulating coating of an electric wire, there can be provided an insulated electric wire which has a high mechanical strength, can be bent at a high degree, and further, is superior in flame retardancy.

Some examples of the present invention will be described below.

As examples 1–4 of the present invention, a copolymer of ethylene and vinyl acetate—(A) (melt index=0.8, content of vinyl acetate=20%), linear chain polyethylene of a low density—(A) (melt index=0.8, density=0.935, durometer hardness=57), modified high density polyethylene, modified polypropylene, magnesium hydroxide, and red phosphorus are kneaded in the proportions shown in Table 1. Then, polyethylene of a high density—(A) (durometer hardness=65) or polypropylene—(A) (durometer hardness=69) are added to the kneaded mixture in the proportions shown in Table 1 to produce a resin composition.

As comparison samples 1–6, a copolymer of ethylene and vinyl acetate—(A), a copolymer of ethylene and vinyl acetate—(B) (melt index=70, content of vinyl acetate= 42%), linear chain polyethylene of a low density—(A), linear chain polyethylene of a low density—(B) (melt index=32, density=0.916, durometer hardness=48), modified high density polyethylene, modified polypropylene, magnesium hydroxide, and red phosphorus are kneaded in the proportions shown in Table 2. Then, polyethylene of a high density—(A), polyethylene of a high density—(B) (durometer hardness=55), polypropylene—(A), or polypropylene—(B) (durometer hardness=58) are added to the kneaded mixture at the proportion shown in Table 2 to produce a resin composition. The methods of manufacturing the resin composition of examples 1–4 and comparison samples 1–6 are described below.

Initially, a mixture of all the polymers except the polyolefin of the material component (c), a flame-retardant agent, and mixing agents is stirred by a Henschel mixer. Then, the mixture is put into a kneader of pressurizing type whose temperature is set to 180° C. to knead the mixture. When the temperature of the mixture is in the vicinity of 150° C., the polyolefin of the material component (c) is put into the kneader and the mixture containing all the polymers is kneaded. When the temperature of the mixture is 180° C.–190° C., the kneading is terminated. Then, the mixture is taken out from the kneader and transferred to a feeder of a single screw granulation extruder whose temperature is set to 170° C. While a cutter portion of the feeder is being cooled with water whose temperature is set to 80° C., the mixture is granulated. The obtained pellet is dehydrated/dried.

In comparison sample 7 shown in Table 2, the polyolefin of the material component (c) is not added to a prior mixture of all of the other material components. Instead, all of the material components including material component (c) are kneaded together at the same time in order to produce the resin composition.

As the copolymer of ethylene and vinyl acetate, Ultracen (trade name) manufactured by Toso Co., Ltd is used. As the linear chain polyethylene of a low density, Jaylex (trade name) manufactured by Japan Polyolefin Co., Ltd is used. As the linear chain polyethylene of a high density, Jaylex (trade name) manufactured by Japan Polyolefin Co., Ltd is used. As the modified high density polyethylene, Adtex ER (trade name) manufactured by Japan Polyolefin Co., Ltd is used. As the modified polypropylene, Adtex ER (trade name) manufactured by Japan Polyolefin Co., Ltd is used. It is to be noted that the copolymer of ethylene and vinyl acetate in the examples 1–4 and comparison examples 1–7 has the block structure.

A pellet of each of these resin compositions formed as described above is put into an electric wire extruder whose temperature is set to 210° C. to extrude each resin composition formed in a thickness of 0.3 mm around the periphery of copper core wire to form thin electric wires. The following characteristics of the resin compositions are evaluated:

(1) Flame retardancy: Using a Bunsen burner having a diameter of 10 mm, the leading end of reducing flame is applied to the lower side at the center of each sample electric wire having a length of 300 mm and supported horizontally until it is burned within 30 seconds. Then, the reducing flame is removed quietly from each sample, and the burned degrees of the samples are examined.

(2) Wear resistance: At a room temperature of 23±5°, the insulation coating surface of each electric wire sample having a length of 750 mm fixed to a table is worn with a blade reciprocated axially in a length not less than 10 mm. The blade is reciprocated at a speed of 50 or 60 times per minute to measure the reciprocated number of times before the blade contacted each conductor as a result of the wear-out of the insulation material. Then, the samples are moved 100 mm and rotated 90° clockwise to carry out the above-described measurement repeatedly. This measurement is carried out four times on each sample and a minimum value is determined as the wear resistance.

(3) Chalking resistance: Each sample electric wire is wound quietly several times on each cylinder having a radius of 6 mm to check the chalked degree of the surface thereof visually.

(4) Extrusion processability: The extruding processability is determined collectively from a high speed extruding characteristic and the appearance of each sample electric wire.

The results are shown in Tables 1 and 2.

TABLE 1

|  | E-1 | E-2 | E-3 | E-4 |
|---|---|---|---|---|
| Copolymer of ethylene and vinyl acetate - A | 30 | 25 | 25 | 30 |
| Copolymer of ethylene and vinyl acetate - B |  |  |  |  |
| Linear chain polyethylene of low density - A | 45 | 50 | 40 | 40 |
| Linear chain polyethylene of low density - B |  |  |  |  |
| Polyethylene of high density - A |  | 5 |  |  |
| Polyethylene of high density - B |  |  |  |  |
| Polypropylene - A | 10 |  | 10 | 10 |
| Polypropylene - B |  |  |  |  |
| Modified polyethylene of high density |  | 20 |  |  |
| Modified polyethylene | 15 |  | 25 | 20 |
| Magnesium hydroxide | 80 | 50 | 70 | 120 |
| Red phosphorus |  | 2 | 1 |  |
| Flame retardancy (horizontal burning test) | P | P | P | P |
| Wear resistance (blade reciprocating method) (unit: number of times) | 829 | 890 | 931 | 438 |
| Tensile strength (unit: MPa) | 24 | 27 | 29 | 21 |
| Elongation (unit: %) | 633 | 547 | 659 | 681 |
| Chalking resistance | P | P | P | P |
| Extrusion processability | P | P | P | P |
| Flexibility | P | P | P | P |

Where E denotes example of the invention and P denotes preferable.

TABLE 2

|  | C1 | C2 | C3 | C4 | C5 | C6 | C7 |
|---|---|---|---|---|---|---|---|
| Copolymer of ethylene and vinyl acetate - A |  | 25 | 3 |  | 30 | 40 | 24 |
| Copolymer of ethylene and vinyl acetate - B | 30 |  | 30 |  |  |  |  |
| Linear chain polyethylene of low density - A | 45 |  |  | 62 | 45 | 45 | 50 |
| Linear chain polyethylene of low density - B |  | 30 |  |  |  |  |  |
| Polyethylene of high density - A |  | 10 | 52 |  |  |  | 8 |
| Polyethylene of high density - B |  |  |  |  |  |  |  |
| Polypropylene - A | 15 |  | 20 | 4 | 15 | 5 | 8 |
| Polypropylene - B |  | 10 |  |  |  |  |  |
| Modified polyethylene of high density |  | 25 | 25 |  |  | 10 | 10 |
| Modified polyethylene | 10 |  |  | 4 | 10 |  |  |
| Magnesium hydroxide | 90 | 50 | 110 | 80 | 30 | 200 | 120 |
| Red phosphorus |  | 2 |  | 1 |  |  |  |
| Flame retardancy (horizontal burning test) | P | P | P | P | U | P | P |
| Wear resistance (blade reciprocating method) (unit: number of times) | 119 | 159 | 62 | 37 | 738 | 12 | 54 |
| Tensile strength (unit: MPa) | 13 | 11 | 14 | 8 | 26 | 6 | 13 |
| Elongation (unit: %) | 690 | 430 | 454 | 591 | 510 | 298 | 401 |
| Chalking resistance | P | P | U | P | P | U | P |
| Extrusion processability | P | U | P | P | P | U | P |
| Flexibility | P | P | U | P | P | U | P |

Where C denotes comparison sample; P denotes preferable; and U denotes unpreferable.

As shown in Table 1, in examples 1–4 of the resin compositions of the present invention, the flame retardancy, the chalking resistance, the extruding processability, and the flexibility are all preferable. Further, the wear resistance is also preferable because the number of reciprocated times of the blade is much more than 300 times, which is the target value. In addition, favorable characteristic values are obtained in the tensile strength and elongation of each wear-resistant and flame-retardant resin composition.

In the comparison samples 1 and 4 in which the melt index of the copolymer of ethylene and vinyl acetate and the content of the comonomer are out of the specified value, the wear resistance and the tensile strength thereof are very low. In comparison sample 2 in which the melt index and the density of linear chain polyethylene of low density and the durometer hardness of polypropylene are out of the specified value, the degree of the wear resistance is low and that of the extrusion processability are also low. In comparison sample 3 in which linear chain polyethylene of low density is not contained and the copolymer of ethylene and vinyl acetate is contained at a low proportion, an appropriate wear resistance is maintained, but the degree of the chalking resistance and that of the flexibility are low. In comparison sample 5 containing magnesium hydroxide at a proportion lower than the specified value, the degree of the flame retardancy is low. In comparison sample 6 containing magnesium hydroxide at a proportion higher than the specified value, all the evaluated characteristics other than the flame retardancy are unpreferable.

In the comparison sample 7 in which all the material components are mixed with each other at the same time and then the mixture is kneaded, the degree of the wear resistance is very low.

Although the present invention has been fully described in connection with the preferred embodiments thereof, it is to be noted that various changes and modifications are apparent to those skilled in the art. Such changes and modifications are to be understood as included within the scope of the present invention as defined by the appended claims unless they depart therefrom.

What is claimed is:

1. A wear-resistant and flame-retardant resin composition containing components (a), (b), (c), (d) and (e), such that the parts by weight of each of the components (a), (b), (c), and (d) is not less than five; the parts by weight of component (a) is less than or equal to the parts by weight of component (b); the total of the components (a), (b), (c), and (d) being 100 parts by weight, and the parts by weight of the component (e) is 40 to 150; wherein:

the component (a) is a copolymer of ethylene and α-olefin having a melt index in a range of 0.1–5 g/10 min., containing α-olefin comonomers in a range of 10–30 wt % and containing one or more oxygen atoms in the molecule, the component (b) is linear chain polyethylene of low density having a melt index in a range of 0.1 to 5 g/10 min., a density in a range of 0.920 to 0.945, and a durometer hardness of 50 to 65, the component (c) is polyolefin having a durometer hardness of not less than 60, the component (d) is unsaturated carboxylic acid or polyolefin modified by a derivative of unsaturated carboxylic acid, and the component (e) is a metal hydroxide.

2. A wear-resistant and flame-retardant resin composition according to claim 1, wherein the component (a) copolymer of ethylene and α-olefin is selected from the group consisting of copolymers of ethylene and vinyl acetate, copolymers of ethylene and ethyl acrylate, and copolymers of ethylene and methyl methacrylate.

3. A wear-resistant and flame-retardant resin composition according to claim 1, wherein the component (c) is selected from the group consisting of polyethylene having a high density and polypropylene.

4. A wear-resistant and flame-retardant resin composition according to claim 1, wherein the unsaturated carboxylic acid of component (d) is maleic anhydride.

5. A wear-resistant and flame-retardant resin composition according to claim 1, wherein the polyolefin of component (d) is selected from the group consisting of polypropylene, high density polyethylene and low density polyethylene.

6. A wear-resistant and flame-retardant resin composition according to claim 1, wherein the component (e) is selected from the group consisting of magnesium hydroxide, calcium hydroxide and aluminum hydroxide.

7. A wear-resistant and flame-retardant resin composition according to claim 1, wherein the composition further comprises a flame-retardant assistant.

8. A wear-resistant and flame-retardant resin composition according to claim 7, wherein the flame-retardant assistant is selected from the group consisting of hydrotalcite, silica, carbon black, zinc borate and compounds of phosphorous.

9. A wear-resistant and flame-retardant resin composition according to claim 1, wherein the composition further comprises anti-oxidant, lubricant, dispersant, copper inhibitor, crosslinking agent, crosslinking assistant or colorant.

10. A method of manufacturing a wear-resistant and flame-retardant resin composition, comprising the steps of:

kneading components (a), (b), (d), and (e); and adding the component (c) to the kneaded mixture of the components (a), (b), (d), and (e), such that the parts by weight of each of the components (a), (b), (c), and (d) is not less than five; the parts by weight of component (a) are less than or equal to the parts by weight of component (b); the total of the components (a), (b), (c), and (d) being 100 parts by weight, and the parts by weight of the component (e) is 40 to 150; wherein:

the component (a) is a copolymer of ethylene and α-olefin having a melt index in a range of 0.1–5 g/10 min., containing α-olefin comonomers in a range of 10–30 wt % and containing one or more oxygen atoms in the molecule, the component (b) is linear chain polyethylene of low density having a melt index in a range of 0.1 to 5 g/10 min., a density in a range of 0.920 to 0.945, and a durometer hardness of 50 to 65, the component (c) is polyolefin having a durometer hardness of not less than 60, the component (d) is unsaturated carboxylic acid or polyolefin modified by a derivative of unsaturated carboxylic acid, and the component (e) is a metal hydroxide.

11. A method according to claim 10, wherein following the adding of component (c), the mixture is again kneaded.

12. A method comprising coating the composition manufactured according to the method of claim 10 onto a conductive core of an electric wire.

13. An insulated electric wire comprising a resin composition forming an insulating coating on a periphery of a conductive core of the wire, the resin composition containing components (a), (b), (c), (d) and (e), such that the parts by weight of each of the components (a), (b), (c), and (d) is not less than five; the parts by weight of component (a) are less than or equal to the parts by weight of component (b); the total of the components (a), (b), (c), and (d) being 100 parts by weight; and the parts by weight of the component (e) is 40 to 150; wherein:

the component (a) is a copolymer of ethylene and α-olefin having a melt index in a range of 0.1–5 g/10 min., containing α-olefin comonomers in a range of 10–30 wt %, and containing one or more oxygen atoms in the molecule, the component (b) is linear chain polyethylene of low density having a melt index in a range of 0.1–5 g/10 min., a density in a range of 0.920–0.945, and a durometer hardness of 50–65, the component (c) is polyolefin having a durometer hardness of not less than 60, the component (d) is unsaturated carboxylic acid or polyolefin modified by a derivative of unsaturated carboxylic acid, and the component (e) is a metal hydroxide.

14. An insulated electric wire according to claim 13, wherein the component (a) copolymer of ethylene and α-olefin is selected from the group consisting of copolymers of ethylene and vinyl acetate, copolymers of ethylene and ethyl acrylate, and copolymers of ethylene and methyl methacrylate.

15. An insulated electric wire according to claim 13, wherein the component (c) is selected from the group consisting of polyethylene having a high density and polypropylene.

16. An insulated electric wire according to claim 13, wherein the unsaturated carboxylic acid of component (d) is maleic anhydride.

17. An insulated electric wire according to claim 13, wherein the polyolefin of component (d) is selected from the group consisting of polypropylene, high density polyethylene and low density polyethylene.

18. An insulated electric wire according to claim 13, wherein the component (e) is selected from the group consisting of magnesium hydroxide, calcium hydroxide and aluminum hydroxide.

19. An insulated electric wire according to claim 13, wherein the composition further comprises a flame-retardant assistant.

20. An insulated electric wire according to claim 19, wherein the flame-retardant assistant is selected from the group consisting of hydrotalcite, silica, carbon black, zinc borate and compounds of phosphorous.

21. An insulated electric wire according to claim 13, wherein the composition further comprises anti-oxidant, lubricant, dispersant, copper inhibitor, crosslinking agent, crosslinking assistant or colorant.

* * * * *